United States Patent [19]

Yang

[11] Patent Number: 5,101,782
[45] Date of Patent: Apr. 7, 1992

[54] ROTARY PISTON ENGINE WITH SLIDE GATE

[76] Inventor: Ki W. Yang, 148-202 Chuogong Apt., Sanbon 2-Dong, Kunpo-Shi, KyungKi-Do, 433-180, Rep. of Korea

[21] Appl. No.: 474,019
[22] PCT Filed: Aug. 29, 1989
[86] PCT No.: PCT/KR89/00012
  § 371 Date: Apr. 26, 1990
  § 102(e) Date: Apr. 26, 1990
[87] PCT Pub. No.: WO90/02259
  PCT Pub. Date: Mar. 8, 1990

[30] Foreign Application Priority Data

Aug. 29, 1988 [KR] Rep. of Korea ............ 88-10956

[51] Int. Cl.⁵ .................................................. F01C 1/16
[52] U.S. Cl. .................................. 123/204; 123/234; 418/9; 418/270
[58] Field of Search .......... 418/9, 201.1, 201.2, 418/201.3, 270; 123/204, 234, 236, 237, 238, 239

[56] References Cited

U.S. PATENT DOCUMENTS

| | | |
|---|---|---|
| 1,877,250 | 9/1932 | Meyer ............................. 123/236 |
| 3,405,604 | 10/1968 | Lysholm ......................... 418/201.1 |
| 3,893,431 | 7/1975 | Gregg ............................. 123/204 |
| 3,977,818 | 8/1976 | Sprankle ......................... 418/201.2 |
| 4,487,176 | 12/1984 | Kosheleff ......................... 418/9 |

FOREIGN PATENT DOCUMENTS 1007250 10/1965 United Kingdom ........... 123/236

Primary Examiner—Richard A. Bertsch
Assistant Examiner—David L. Cavanaugh
Attorney, Agent, or Firm—Nixon & Vanderhye

[57] ABSTRACT

A rotary piston engine comprising two segregated body chambers of compression and expansion, and one separable combustion chamber, carrying out air suction and compression, combustion resultant expansion and exhaust, and fuel injection and constant-volume combustion process without any valve respectively: the compression and the expansion chamber both are arranged parallel adjacent to each other, both are formed by two partially overlapped body-bores provided respectively with cylindrical hubs at respective centers thereof, both have a pair of screwed rotors rotatably mounted on said respective hubs, and both communicate to each other by the combustion chamber and gas passageway means; it is characteristic in configuration that the closed space made by rotor projecting portions are progressively changed in geometry as rotors rotate, and that exhaust gases make no explosion noises.

5 Claims, 9 Drawing Sheets

ROTARY PISTON ENGINE WITH SLIDE GATE

TECHNICAL FIELD

The present invention relates to an internal combustion rotary engine and to a method of its operation. This invention particularly relates to a compression-ignition rotary engine with simple construction and no valve.

It is one object of this invention to provide the engine and its operation method that overcome compression-ignition constant-volume combustion in high-speed.

Another object of this invention is to provide the engine that the volume-change of working fluid is progressively made in the compression and the expansion process.

Another object of this invention is to provide the engine having the embodiment readily to maintain sealing of working fluid.

Another object of this invention is to provide the engine that exhaust gases make no explosion noises, the thermal efficiency increasing the higher instead.

BACKGROUND ART

Since the wankel rotary engine has invented, several rotary engines having paired rotors meshed with each other, such as the E. Martin's Multi-Stage Engine (U.S. Pat. No. 3,214,907 dated Nov. 2, 1965) and K. D. Sauder's Rotary Internal Combustion Engine (U.S. Pat. No. 3,724,427 dated Apr. 3, 1973), are invented up to the present. These engines all are inventions using the principle that the volume of a space made by recesses between projecting portions of rotors are changed as rotors rotate.

In internal combustion engines, the volume change in working chambers must progressively be made. In other words, one of a closed space in a working chamber must progressively be decreased or increased without opening to another space before finishing a unit process of compression or expansion. If the opening takes place, working fluid back flows, or irreversibly expands in a moment without producing power, which either results in loss of energe due to increase in entropy.

None of the said engines makes combustion gases fully expand to 1 atm only with one expansion chamber. Therefore, they must be comprised of plurality of segregated expansion chambers fully to expand combustion gases to 1 atm. This results in a complex and large-size construction. On the other hand, these engines having rotors meshed with each other cannot inherently resolve the problem of working fluid sealing because a clearance is required between the intermeshed rotors for absorbing the movement of thermal expansion of heated roters.

Thermodynamically, as well-known, the thermal efficiency of a constant-volume combustion engine is higher than that of a constant-pressure combustion engine operating under the same condition of compression ratio and cooling loss. For example, the thermal efficiency of the otto cycle on constant-volume combustion is higher than that of the diesel cycle on constant-pressure combustion operating at the same compression ratio. In otto cycle spark-ignition engines, however, the compression ratio of an engine is limited to some maximum value, to preclude preignition of a homogeneous air/fuel mixture. Therefore, the thermal efficiency is practically limited to some value. This problem is resolved somewhat by the compression-ignition diesel engine. Thus the compression ratio, and consequently the efficiency, generally is higher than that of the spark-ignition engine. But because the system uses a heterogenous air/fuel mixture, the diesel engine operates at lower RPMs and therefore has a lower power output.

These problems can be overcome by the Ki W. Yang's Rotary Engine (U.S. Pat. No. 4,813,388, dated Mar. 21, 1989) which achives both constant-volume combustion and constant-pressure exhaust at a high compression ratio and a high RPM. The Yang's Engine, however, makes the new problem that its combustion chamber is not simple in construction and that a dead-space—though small, causing combustion gases irreversibly to expand somewhat without producing power—exists in its expansion chamber.

It is the ultimate object of the present invention to overcome the all problems stated above.

DISCLOSURE OF INVENTION

The present invention is constituted so that: the compression and the expansion of working fluid are progressively advanced by a pair of rotors perfectly balanced in moment of inertia, as if the compression and the expansion in a reciprocating piston engine are carried out by pistons; the combustion chamber is segregated both with the compression chamber and with the expansion chamber, is simple in construction, and is made to close without any valve during fuel burning; fuel is injected after high temperature compressed air is heated to the higher temperature by previously combusted gases; and working fluid sealing is readily maintained. The detailed description about the construction of the present invention is as follows.

This invention is comprised of a compression and a expansion mating-body-bore chamber and a separable combustion chamber, carrying out air suction and compression, combustion resultant expansion and exhaust, and fuel injection and combustion process without any valve respectively. The compression and the expansion chamber are both formed by two partially overlapped bores provided respectively with cylindrical hubs at respective centers thereof. These chambers are arranged parallel adjacent to each other, and have identical shape to each other, but the expansion chamber is larger in size than the compression chamber. Both these chambers have a pair of rotors (each different in shape) which are rotatably mounted on respective cylindrical hubs by slipping-in. The compression and the expansion chamber communicate to each other by the separable combustion chamber and gas passageway means.

The rotors all take the screwed shape: one rotor of each pair has 3 projecting portions, but the other has 2 projecting portions. All the rotors have so a empty portion around the shaft that cylindrical hubs are slipped into the empty portion to support the rotors; the empty portion is much longer than the rest non-empty portion. For sake of convenience, the rotors having 3 projecting portions are called female rotor, and the others having 2 projecting portions are called male rotor hereinafter. But, as their function, the rotors in the compression chamber can be called compression rotor, and the others in the expansion chamber can be called power rotor (due to producing power) hereinafter; for example, the rotor having 3 projecting portions in the expansion chamber is called power female rotor.

Each female rotor has a ringlike plate with comparatively small holes. Hereinafter, the holes of the compression female rotor are called compressed-air outlet (briefly comp-air outlet), and those of the power female rotor are called combusted-gas inlet (briefly comb-gas inlet). All the rotors are interconnected by a set of timing gears so that the female rotors may make 2 rotations for 3 rotations of the male rotor. Thus a space made by recesses between projecting portions of rotors is progressively increased or decreased in closing state, as rotors rotate. Hereinafter, the space in the compression chamber is called compression pocket, and that in the expansion chamber is called expansion pocket. Air is gradually compressed in the compression pocket without back-flowing, and combustion gases are gradually expanded in the expansion pocket without producing power.

Each of the cylindrical hubs is provided with a seal with springs so that the thermal expansion movements of heated rotors may be absorbed, which prevents working fluid from leaking out from respective pockets. These hubs are all stuck on one end plate of the compression and the expansion chamber; the other end plate is additionally used as the wall of a timing gear box.

The compression and the expansion chamber respectively have one air inlet and one exhaust gas outlet that are symmetrically arranged near the end plate with the timing gear box and along bores-met edges of each chamber. As rotors rotate, it is in steady flow that air is sucked into the compression chamber through the air inlet, and that exhaust gases are discharged into the atmosphere through the exhaust-gas outlet.

The hubs-stuck end plate has a compressed-air passage (briefly called comp-air passage) and a combusted-gas passage (briefly called comb-gas passage) which both take the shape longish in cross-sectional view. Especially, comb-gas passage is equipped with a flow control gate for controlling the amount of combustion gases flowing from the combustion chamber into the expansion chamber. The comb-gas passage is partially opened or closed some more by flow control gate operation with moving forward or backward. The comp-air passage and the comb-gas passage periodically communicate to the compression and the expansion pocket through the comp-air outlet and the comb-gas inlet respectively, as rotor rotate. In other words, these passages are opened when the comp-air outlet and the comb-gas inlet, turning, respectively communicate to the compair and the comb-gas passage in a moment.

The rotor-supported hubs all are stuck on the end plate by bolting their flanges. The hub flange corresponding to the compression female rotor has a comparatively small hole extended from the comp-air passage, and also another hub flange to power female rotor has a similar hole extended from the comb-gas passage. On these two flanges, a combustor simple in construction is connected so as to communicate from the compression chamber through its combustion chamber to the expansion chamber. Thus it is possible through said respective holes that compressed air flows from the compression chamber to the combustion chamber, and that combustion gases in the combustion chamber flow into the expansion chamber, as the comp-air and the comb-gas passage are opened respectively; these holes are called passage also.

In the present invention constructed as described above, air compression and combustion gas expansion are progressively advanced according to rotating of rotors operating as a piston without back-flowing of compressed air and without irreversibly expanding of combustion gases, as in a reciprocation piston engine. However, a little back-flowing of air takes place in the initial period of a compression process.

In the compression chamber, there are the two points at which the end plate wall to the timing gear box side meets the 2 edges made by the 2 partially overlapped bores. One of the two points is located to the side that the projecting portions of rotors meet to each other, and the other is located to the side that those depart from each other, as rotors rotate. The former is called compression start point hereinafter.

In the compression chamber, as the rotors rotate, it is continuously made that the compression pocket is born at the air inlet and grows up gradually, sucking the air. Then, if the front side of the compression pocket of the male rotor arrives at the compression start point, the projecting portion of the female rotor begins to enter the pocket to compress the air in it. Then if the rotors turn some more, the projecting portion of the female rotor depatrs from the compression start point, and then another compression pocket of the female rotor containing air not yet compressed arrives at the compression start point. Then, this pocket communicates to the male rotor pocket containing air already compressed somewhat. Therefore, at this time, according to the pressure difference of these two pockets, a little back-flowing of the air from the male rotor pocket to the female rotor pocket takes place in a moment.

Generally in compression process, when a back-flowing of compressed air occurs, irreversible expanding of the air takes place simultaneously. This expansion does not produce any power, and therefore makes a increase in entropy instead. The entropy increase either in compression process or in expansion process consequently makes a decrease in thermal efficiency, proportion to that.

In the present invention, the back-flowing of air occurs in the initial period of a unit compression process. Moreover, the rotors of this invention take screwed shapes. Hence, when the male rotor compression pocket communicates to the female rotor compression pocket since the projecting portion of the female rotor enters the said male rotor pocket, the air is appreciably compressed in the male rotor compression pocket; that is, there is no appreciable difference of pressures of the two pockets. Therefore, the air appreciably back-flows into the compression pocket of the female rotor, and the entropy increase is negligible. Consequently, the back-flowing can scarcely affect the thermal efficiency of the present invention.

Then if the rotors turn some more after the two pockets meet to each other, the projecting portion of the male rotor, reversely, enters the compression pocket of the female rotor and thus the air in the pocket is progressively compressed; the back-flowing does not occur until finishing this compression. Then, when the unit compression process is almost finished, the comp-air outlet arrives at the comp-air passage to open to the compression pocket, and then the compressed air is all discharged through this passage to the combustion chamber because the pocket containing the compressed air is gradually reduced and finally becomes null while the comp-air passage is opened.

If, in the compression process of the present invention, the back-flowing takes place in the last stage of the unit compression process, not in the initial period, the present invention will be unsuccessful as an engine, such as the K. D. Sauder's Rotary Internal Combustion Engine stated previously. The Sauder Engine has the rotors exactly indentical to each other. Therefore, one recess-space between the projecting portions of the rotor, in a compression process, opens to another faced, and then this combined space again opens to another following before this space becomes null, which is repeated continuosly. Hence, the compressed air back flows from one recess-space to another, here and there, continuously, which results in decrease in thermal efficiency.

Now consider that, in the compression chamber of the present invention, the compression pocket containing the compressed air is gradually reduced and finally becomes null while the comp-air passage is opened. Reversely in the expansion chamber, when the comb-gas inlet just arrives at the comb-gas passage, the expansion pocket is born at this comb-gas inlet, the comb-gas passage being opened. Then this pocket gradually grows up in closing state, as rotors turn. Then after fully grown up, this pocket arrives at the exhaust-gas outlet, and then is gradually reduced. These actions reversely corresponds to those in the compression chamber.

In the expansion chamber, the point corresponding to the compression start point is called expansion finish point hereinafter. As the rotors rotate, if the expansion pocket is born, combustion gases flow from the combustion chamber through the comb-gas passage into the just born expansion pocket. Then, the combustion gases expand making the rotors rotate; that is, the expansion pocket grows up and thus power is produced. Then if the rotors turn considerably and thus the projecting portion of the female rotor arrives at the expansion finish point, the expansion pocket is split into two: one fully grown and the other yet growing up. At this time, if the two pockets do not communicate with each other by a passage, combustion gases in the fully-grown expansion pocket of the female rotor can not expand any more. In the expansion chamber, so as not to make this case, the expansion chamber has a gas passageway called pressure balance passage formed by a groove on the body end face contacted with the end plate additionally used as the wall of the timing gear box. Thus through the said pocket is split into two pockets, both communicate with each other by the pressure balance passage. Therefore, combustion gases in the fully-grown pocket as well as in the growing pocket expand producing power. In the expansion chamber of the present invention, hence, the combustion gases progressively expand by rotating of rotors operating as pistons, as if the gases expand in a reciprocating piston engine, and consequently the energe for the pressure of combustion gases can all be converted into an useful power. Then if the rotors turn some more, each of these pockets is opened to the exhaust-gas outlet and then combustion gases are discharged into the atmosphere by reducing of the pockets.

Now consider the problems not resolved by the constant-volume combustion otto cycle engine and the constant-pressure combustion diesel cycle engine stated previously. Any engine cannot resolve all the problems of high speed operation, high compression ratio and constant-volume combustion. However, these problems are resolved by this invention.

The combustion chamber of this invention has at least a fuel injection nozzle and a spark plug similar to those used in a diesel and a gasoline engine, respectively. As the comp-air passage is opened to the compression pocket and thus the compressed air flows into the combustion chamber, fuel is then injected into it in an atomized form through the fuel injection nozzle as in a diesel engine. Thus the fuel is immediately autoignited and combusted. The combustion chamber is closed while the fuel burns. Therefore the pressure in the combustion chamber is rapidly increased to a higher value. After the fuel ingection is finished, the expansion pocket is born, and the comb-gas passage is opened to the just born expansion pocket. Thus combustion gases flow out into the expansion chamber, expanding progressively. The pressure in the combustion chamber gradually decreases according to the expansion of combustion gases. However, when the pressure drops to the same pressure as that of the compressd air to enter in from the compression chamber, the comb-gas inlet departs (closed) from the comb-gas passage, and then the pressure cannot drop any more in the combustion chamber due to the stop of expanding of gases. Strictly speaking, the flow control gate equipped at the combusted-gas passage operates; moving forward or backward; depending on the load of the engine (invention)—in other words, depending on the amount of injected fuel—so as to prevent the pressure in the combustion chamber from dropping under the pressure of the compressed air to enter in from the compression chamber. Thus, the pressure of gases left in the combustion chamber in stop of expanding is maintained equal to that of the compressed air entering in from the compression chamber. Hence, though the pressures are the same, the temperature of left gases is much higher than that of the entering compressed air. Into this combustion chamber containing the high temperature combustion gases, the compressed air is introduced from the compression chamber, and is heated by mixing to a higher temperature than before the mixing. Hence, though air is compressed at the same compression ratio as in a diesel engine, the compressed air introduced into the combustion chamber has a higher temperature than that of the diesel engine at the end of the compression stroke. Generally, the higher the temperature is, the faster the fuel combustion is. Therefore, the fuel injected into the combustion chamber of this invention autoigites and burns more rapidly than in the diesel engine. In this invention, moreover, the combustion chamber is closed during the combustion, fuel burning in a constant volume. Hence, not only the temperature of working fluid but also the pressure is rapidly increased to a higher value during the combustion in this invention than in the diesel engine. This combustion, though its action is so rapid, is progressively advanced depending on the fuel injection, which is repeated three times a rotation of the female rotor. This combustion is distinguished from the constant-volume combustion that air/fuel mixture is deflagrated in a moment by a spark-ignition in an otto cycle engine. The progressive combustion has an effect on combustion knock suppression, as will later be described again.

In brief as described above, the present invention can be operated in constant-volume combustion not only at a high compression ratio, but also at a high speed because of both the rapid combustion and the perfect balance of the rotors in moment of inertia. Consequently, this invention has a higher thermal efficiency and also has a higher power output.

The rotor-rotated angles related to the compressed air enterance, the fuel injection and combustion, and the flowing-out of combustion gases can be represented by equations as follows.

$T = A + X + Y + P + Q = 120°$ constant $X + P =$ constant $Y + Q =$ constant where these angles are all based on the rotation of the female rotor:

T = Whole Angle made by the rotor rotating during the unit process in the combustion chamber.

A = Air-Input Angle made by the rotor rotating while the compressed air enters the combustion chamber.

X = Fuel Injection Angle made by the rotor rotating during the fuel injection.

Y = Gas Output Angle made by the rotor rotating while combustion gases flow out from the combustion chamber after the fuel injection.

P = Fuel Pre-Injection Angle made by the rotor rotating while the fuel is injected before the compressed air finishes entering in; in this case, $P < 0$; but if fuel begins to be injected after the air finishes entering in, P is positive.

Q = Gas-Output Extention Angle made by the rotor rotating while the gases flow out after the compressed air begins entering in for the following combustion process; in this case, $Q < 0$; but if combustion gases finish flowing out before the compressed air begines to enter in, Q is positive.

The air input angle A is a constant defined according to the configuration of this invention, and the others all are variables depending on the load of this invention in operation. For example, suppose that this invention operates in following states:

|  | A | X | Y | P | Q | T |
| --- | --- | --- | --- | --- | --- | --- |
| Light Load | 40° | 25° | 45° | 5° | 5° | 120° |
| Heavy Load | 40° | 40° | 55° | −10° | −5° | 120° |

In the case of light load, the fuel injection and combustion takes place while the female rotor makes 25 degree rotation, and in the heavy load, the fuel injection and combustion continues while the rotor makes 40 degree rotation.

The combustion chamber is provided with a sparkplug. It is used when this invention is difficult to start to operate due to the low temperature of the air, such as in the winter. When the temperature of the air is low, fuel is injected and electric sparks are simultaneously generated by the spark plug. Thus the injected fuel ignites easily though the temperature is low.

In a compression-ignition engine such as a diesel engine, the combustion knock takes place when the ignition lag in time between the attainment of the autoignition temperature and the spontaneous local appearance of the flame is comparatively long. Thus knocking reduction requires short ignition lags in the compression-ignition engine. On the other hand, the higher the temperature of air/fuel mixture is, the shorter the ignition lag is. Consider that the temperature of air/fuel mixture is much higher in this invention than in the diesel engine operating at the same compression ratio. In this invention, the so higher temperature prevents the combustion knock from producing. If the knocking occurs in piston engines, the air and the oil films on the cylinder walls are destroyed by the sharp pulsation caused by the knocking, and consequently the cooling loss (heat loss) of the engine is rapidly increased. The extreme knocking can destory the engine. In this invention, the combustion chamber is segregated form the compression and the expansion chamber differently than the cylinder in the piston engine. Thus though the knocking takes place in this invention, the air and the oil films on the walls of the compression and the expansion chamber are scarcely influenced by the pulsations by the knocking.

The present invention makes the combustion gases expand to 1 atm or a predetermined pressure when operated in the maximum load. If not equipped with a vacuum preventing device in the expansion chamber, the present invention in light load will make the gases be overexpanded below 1 atm.

In the present invention, a washerlike disk is inserted between the power female rotor and the end plate having the timing gear box. This disk has both a gas passageway in the shape of a groove existing on the rotor side partially, not around, and a gear which partially exists on the opposite side to the gas passageway, and is meshed with a pinion. These disk and passageway are respectively called vacuum preventing disk and gas feedback passage, hereinafter. This vacuum preventing disk is operated depending on the load (i.e., the amount of injected fuel) of this invention, turning right or left by the pinion turning, so as not to make the combustion gases be overexpanded below a predetermined pressure. That is, the female rotor expansion pocket containing combustion gases in expanding communicates to the exhaust gas outlet side by the gas feedback passage when the gases just expand to a predetermined pressure (generally 1 atm). Thus, the gases of the outlet side flow into the said pocket through the gas feedback passage after the gases of said pocket are fully expanded, which prevents the gases from being overexpanded below a predetermined pressure. In this way, the present invention can make the exhaust gas pressure maintain 1 atm or a predetermined pressure below 1 atm, without any valve in high speed operation. In this invention, thus, exhaust gases make no explosion noises, thermal efficiency increasing the higher instead.

This invention can operate as an external combustion engine as the Stirling Engine if only provided with a heat exchanger instead of the combustion chamber and/or another heat exchanger at the exhaust gas outlet. In this case, the operation method for this invention is the same as the internal combustion method except the fual injection.

This invention can be operated as a spark-ignition engine in the method that air/fuel mixture ignites by a electric spark after compressed at comparatively low compression ratio as in the gasoline piston engine. In this case, it is more desirable that fuel is continuously injected into the compression pocket than that fuel should be supplied by a carburetor.

The configuration of this invention provided at the respective rotor centers with the cylindrical hubs with the seal to prevent working fluid from leaking is much better in working fluid sealing than that of the engine having paired rotors, such as the E. Martine's Multistage Engine and K. D. Sauder's Rotaty Internal Combustion Engine as stated before, though not much better than that of a piston crank engine. This invention cannot be equipped with the seal on the screwed and the recess surfaces of the rotors. However, the configuration of this invention makes it possible to be equipped with seals on the other surfaces including the walls of the compression and the expansion chamber, as if the wankel rotary engine is equipped with seals. The circumferential surfaces of the rotor projecting and the rotor recess portions, in the zone not existing of the hubs, meet to each other in rotating, and thus have no seals, and added to that, require a clearance against thermal expansion movements of faced rotors. Thus it is impossible to seal working fluid in the zone not existing of hubs. However, in this zone, because the pressure is very low either in the compression chamber or in the expansion chamber, working fluid can scarcely leak from the respective pockets. High pressure exists in the other zone that hubs with seals are inserted into the respective rotor centers. In the hub-existed zone, the seals are contacted sliding on the circumferencial surfaces of the rotor projecting portions. Hence, these seals prevent working fluid from leaking out from the pockets, which is different in configuration than any other engines having pairs of rotors faced to each other.

BEST MODE OF CARRYING OUT THE INVENTION

The drawings show the outline of the present rotary piston engine 10 that the compression and the expansion chamber are arranged parallel with each other.

Figure 1:
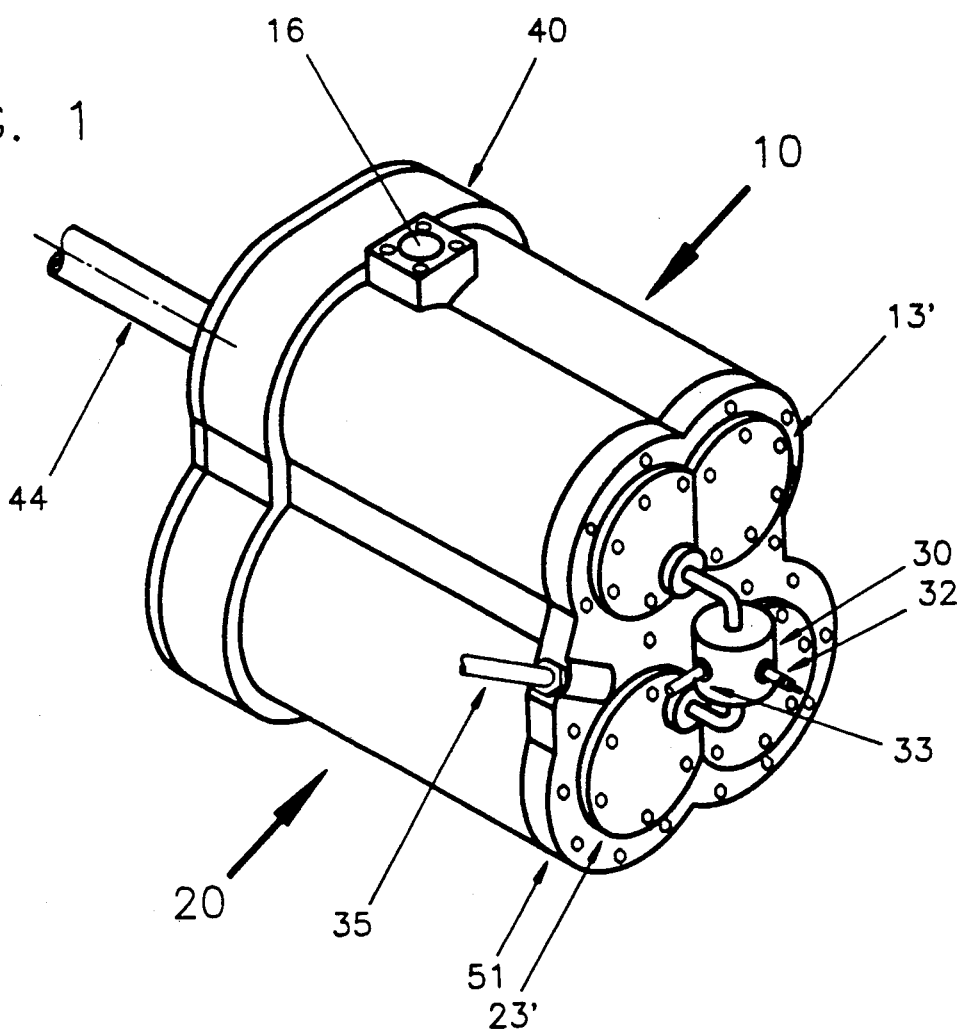
FIG. 1 is a perspective view of the outline of the embodiment of the present invention
Figure 2:
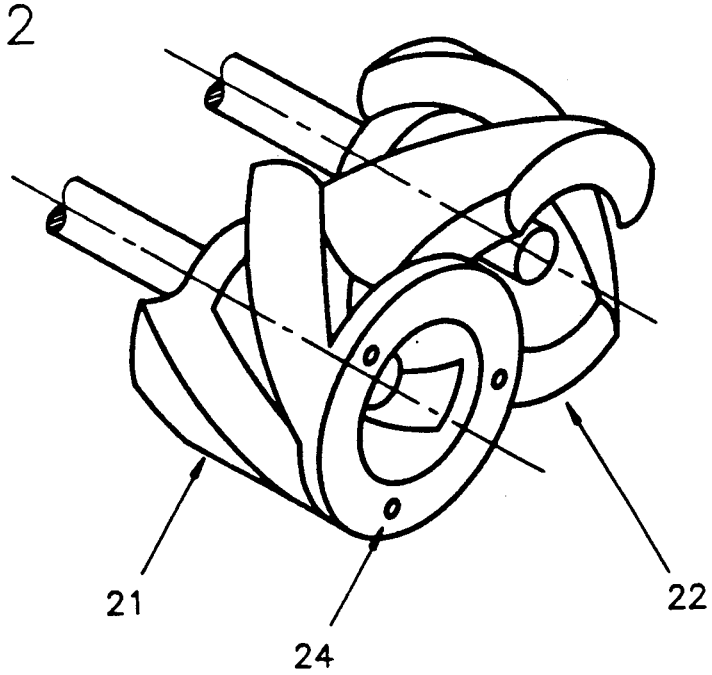
FIG. 2 is a perspective view of a typical pair of rotors of the present invention.
Figure 3:
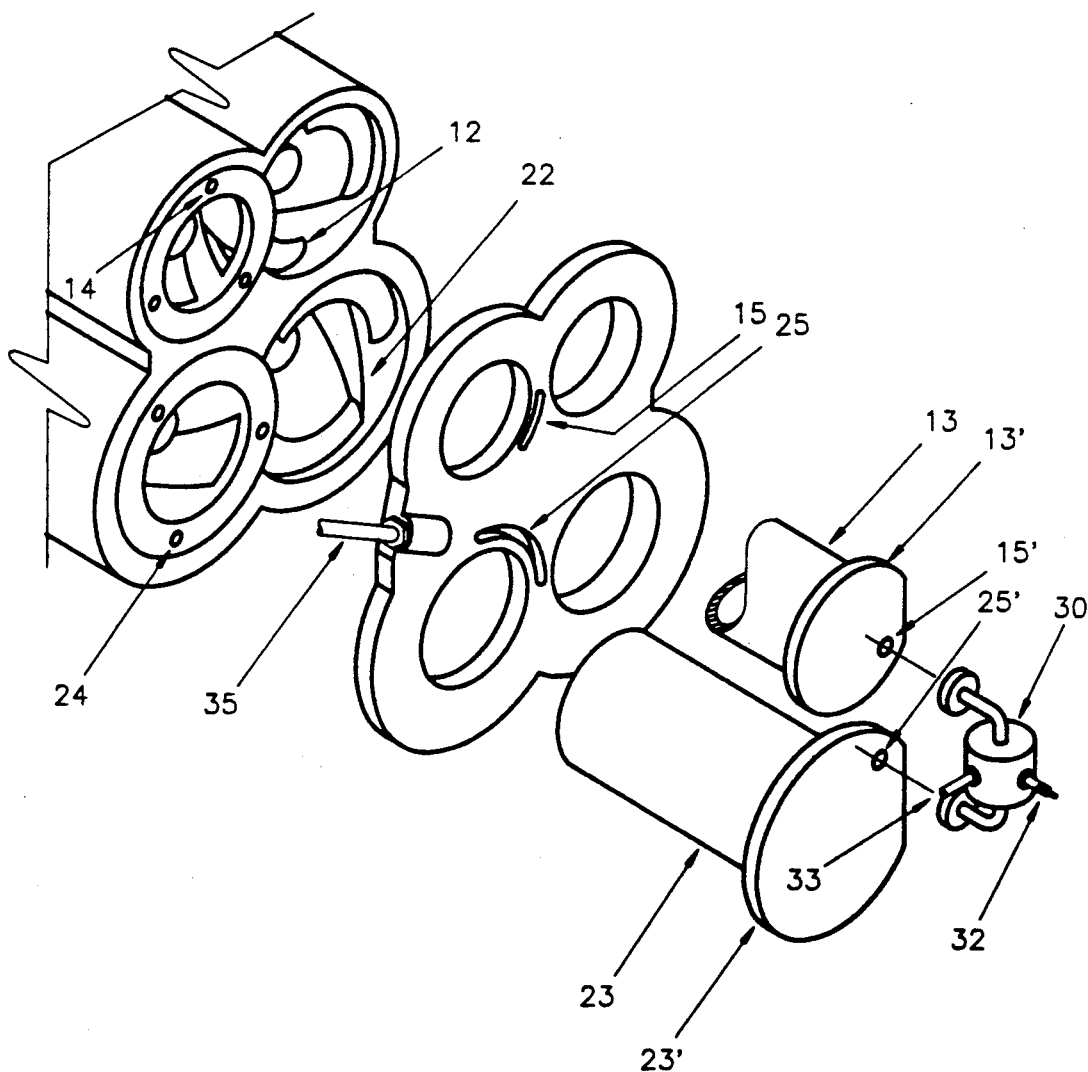
FIG. 3 is a perspective view of the present invention disassembled partially.
Figure 4:
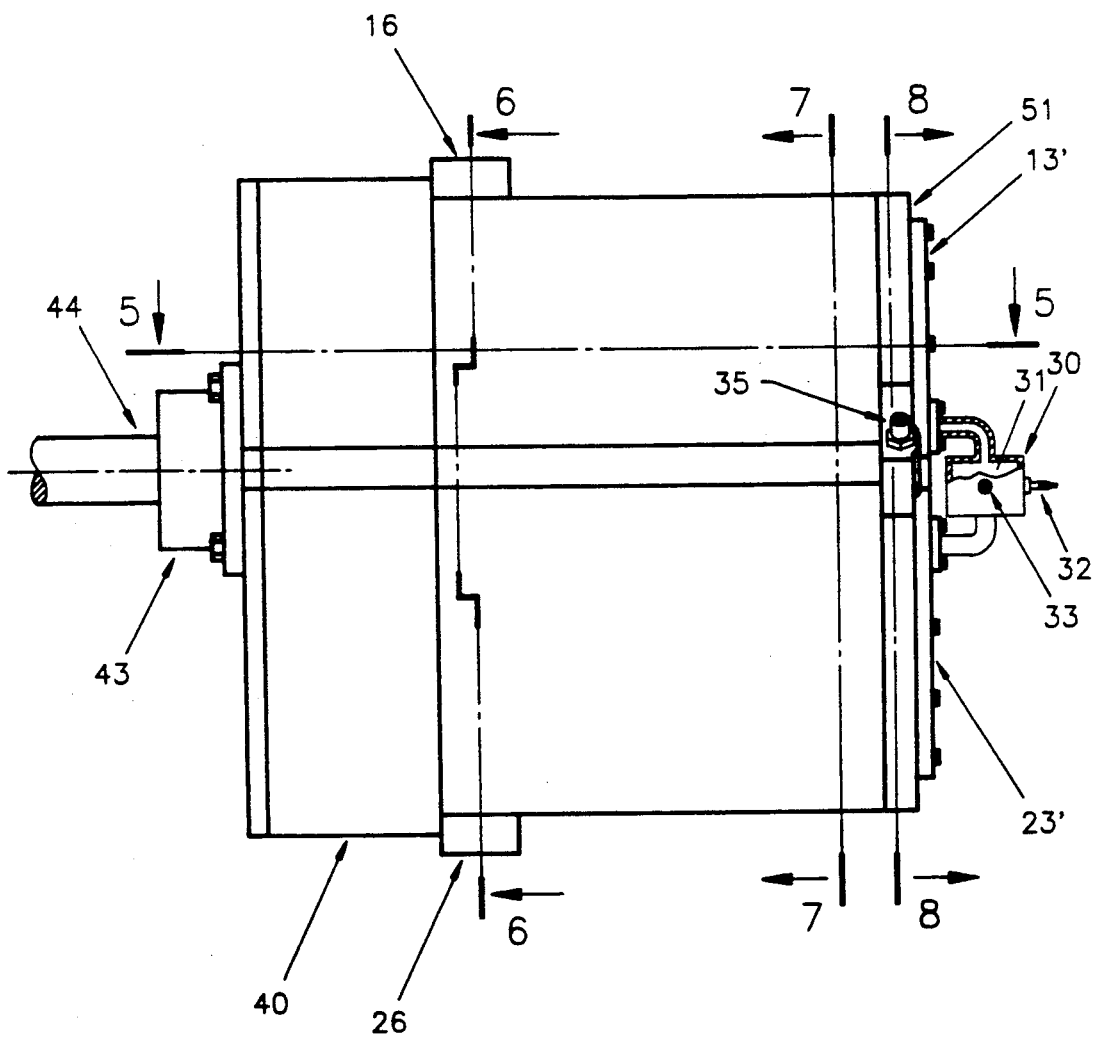
FIG. 4 is a side view of the embodiment of the present invention.

FIG. 2 shows one typical pair of rotors of this invention, taking the screwed shape with the borelike empty portion at respective rotor centers. These rotors are inserted both in the compression chamber and in the expansion chamber so as to travel in circular paths, being supported from the cylindrical hubs 13, 23 inset into the end plate 51. The compression female rotor 11 and the power female rotor 21, and also the compression male rotor 12 and the power male rotor 22, are geometrically symmetrical as mirror image to each other, but are different only in size. All rotors are interconnected by a set of timing gears 41 so that the female rotor may make 2 rotations for 3 rotations of the male rotor.

Figure 9:
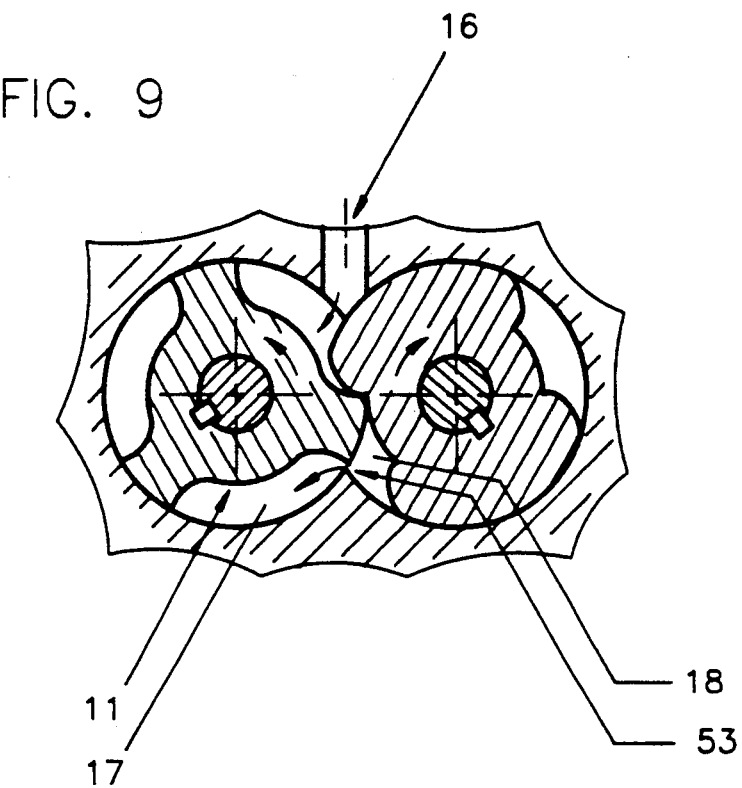
FIG. 9 is a partial cutaway view to illustrate the compression process of the present invention.

As these rotors rotate, air is sucked in steady flow into the compression chamber through the air inlet 16, and then is transferred to the opposit side from the air inlet by the pockets 17, 18 driving it. Then the air in the male rotor pocket 18 begins to be compressed after this pocket arrives at the compression start point 53. Then, as the female rotor pocket 17 also arrives at the compression start point, both pockets 17, 18 are combined into one. Thus, as shown in FIG. 9, when these are just combined, the air appreciably back-flows from the male rotor pocket 18 to the female rotor pocket 17 by the pressure difference of the pockets 17, 18. However, because the air is still slightly compressed, there is no appreciable difference of their pressures. Thus, the back-flowing is negligible in increase in entropy. As the rotors continue to turn, the air is progressively compressed without back-flowing until the comp-air outlet 14 arrives at the comp-air passage 15. Then, while when the compression pocket 17 containing the compressed air communicates with the comp-air passage 15 at the time comp-air outlet 15 arrives at the comp-air passage 15, this compressed air at high pressure is entirely discharged to the combustion chamber 31 through the comp-air outlet 14 and passage 15,15'. The compression process including the suction and discharge described above is repeated 3 times for each rotation of the female rotor.

Figure 8:
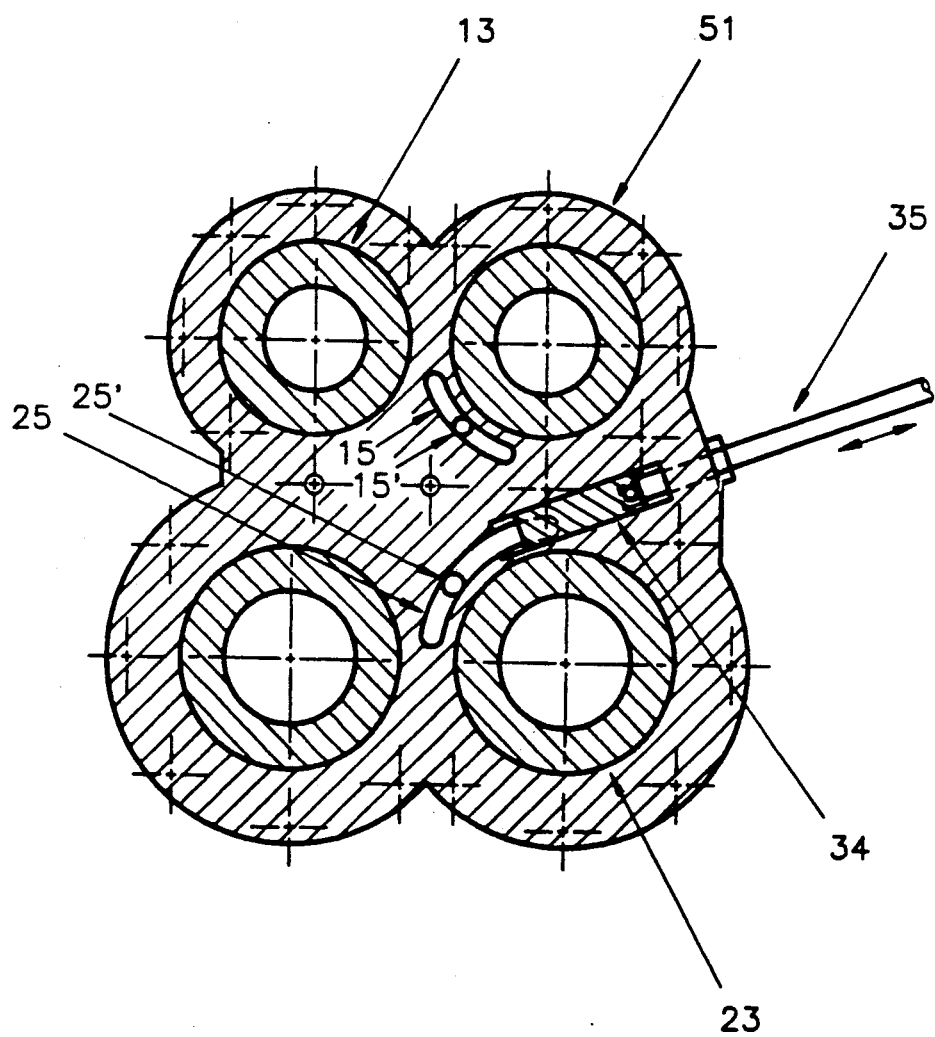
FIG. 8 is a sectional view taken along line 8—8 of FIG. 4.

In the expansion chamber, as the comb-gas inlet 24 arrives at the comb-gas passage 25,25', the expansion pocket 27 is born thereat, and simultaneously the comb-gas passage 25,25' is opened. Thus, combustion gases flow from combustor 30, having a combustion chamber 31, a sparkplug 32 and a fuel injector nozzle 33, into this born pocket, and the pressure in the combustion chamber decreases gradually; that is, the gases expand making the power rotors turn, in other words, the gases expand making the pocket grow. Then, when the pressure in the combustion chamber decreases to the same value with that of the air to enter in from the compression chamber, the comb-gas passage 25 is closed by the comb-gas inlet 24 departing from it, and thus gases in the combustion chamber pause to flow out to the expansion chamber. Therefore, the pressure in the combustion chamber does not decrease any more. Strictly speaking, the flow control gate 34 with gate stem 35 equipped on the end plate 51, as shown in FIG. 8, early or late closes the comb-gas inlet 24, so moving forward or backward depending on the load of this invention—that is, depending on the amount of injected fuel—that the pressure in the combustion chamber decreases to the same value with the pressure of the air to enter the combustion chamber.

Figure 10:
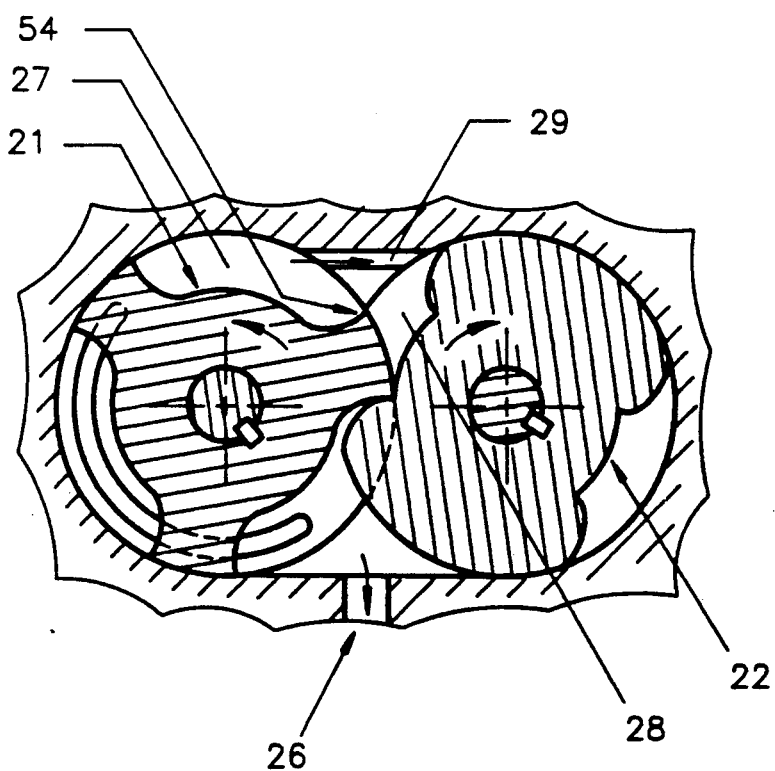
FIG. 10 is a partial cutaway view to illustrate the expansion process of the present invention.

After the comb-gas passage 25 is closed, the combustion gases in the combustion chamber stop expanding, but the gases already introduced into the expansion chamber still expand continuously, producing power. Then, if, as shown in FIG. 10, the projecting portion of the femal rotor arrives at the expansion finish point 54 as the rotors turn some more, the female rotor pocket 27 is fully expanded and segregated from the male rotor pocket 28 as the latter continues to expand. However, though segregated, they communicate with each other by the pressure balance passage 29. Therefore, the gases in the female rotor pocket 27 as well as in the male rotor pocket 28 make the male rotor turn, expanding through this pressure balance passage 29 until the projecting portion of the male rotor arrives at the expansion finish point 54. After both pockets have expanded fully, the gases are transferred to the exhaust-gas outlet 26 by the pocket driving them, and then are discharged into the atmosphere according to reducing of the said pockets.

The expansion and exhaust process is repeated 3 times for each rotation of the female rotor.

Figure 11:
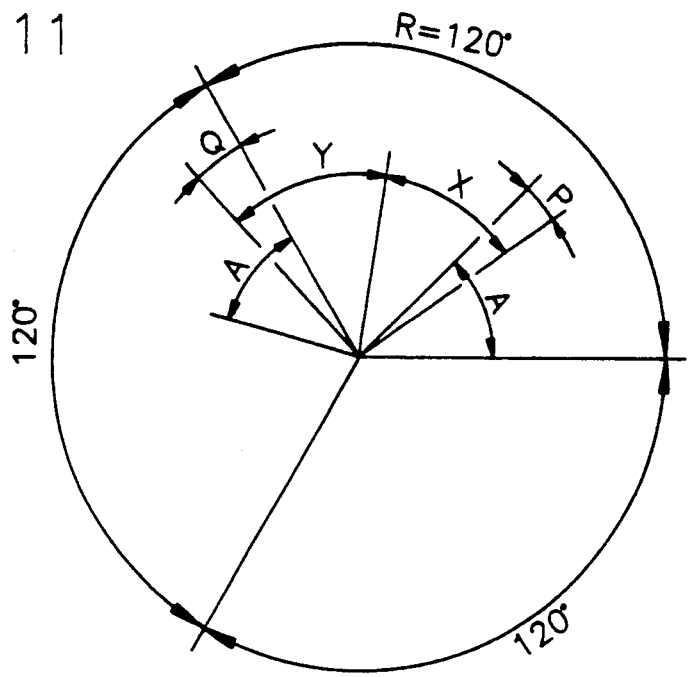
FIG. 11 is a diagram to illustrate the combustion process of the present invention.

FIG. 11 shows the rotor-turned angles and their relationship in order to illustrate the combustion process. The symbols used in FIG. 11 are the same as those of the equations defined previously.

While the female rotor makes the 120 degree revolution as shown in FIG. 11, roughly speaking, the air sucked and compressed in the compression chamber enters the combustion chamber; then therein fuel is injected; then it burns; and then the resultant (gases) flows out to the expansion chamber, expanding and producing power. Consider that when the comp-air passage 15 is just opened to the compression pocket (when $A=0$ in FIG. 11), the combustion gases left in the combustion chamber have the same pressure as the compressed air to enter the combustion chamber has, but have a much higher temperature than the temperature of this compressed air. After the passage 15 is opened ($A>0$), the compressed air which has the high temperature due to the compression in the compression chamber, flowing in the combustion chamber, is heated to a higher temperature by mixing with burnt gases left therein from the previous precess, which continues while the female rotor makes the A-degree turn. Thus the temperature of air/gases mixture is high enough to autoignite injected fuel. Then, fuel is injected into the combustion chamber in an atomized form as in a diesel engine, so that the injected fuel ignites automatically and burns, immediately. The amount of injecting fuel is adjusted depending on the load of this invention; for example, in the case of overload, the fuel begins to be injected before the compressed air finishes entering the combustion chamber ($P<0$: preinjection); and in the case of light load, the fuel begins to be injected after the air finishes entering ($P>0$: postinjection). This fuel injection continues until the female rotor makes the turn of degree "$X+P$" after the air entering. Then the expansion pocket is born, and the comb-gas passage 25 is opened to the just born expansion pocket 27 the comb-gas inlet 24 arriving at this passage, thus combustion produced by the combustion expand flowing into the expansion chamber, making the power rotor turn, and the pressure decreasing in the combustion chamber as well as in the expansion chamber, which continues until the comb-gas passage 25 is closed depending on the load, and during which time the female rotor makes Y-degree turn. The passage 25 is early closed in the light load ($Q>0$), but is late closed in the overload ($Q<0$). Thus after the female rotor makes the turn of degree "$Y+Q$", the compressed air begins to enter the combustion chamber, and then the combustion process described above is repeated again; namely, this process is repeated three times for each rotation of the female rotor.

In the 4-strock stroke piston engine having 4 pistons, a power is produced two times a rotation of the crank shaft. In the present invention, on the other hand, the process of the air suction and compression, fuel injection and combustion, and combusted-gas expansion and exhaust in series is continuously repeated three times for every rotation of the female rotor. In this invention, therefore, power is also produced three times for each rotation of the female rotor. Moreover, this invention can be operated at much higher speed because there is no reciprocating unbalance as in the piston engine. Hence, it is possible that the present invention has a higher power output.

Figure 6:
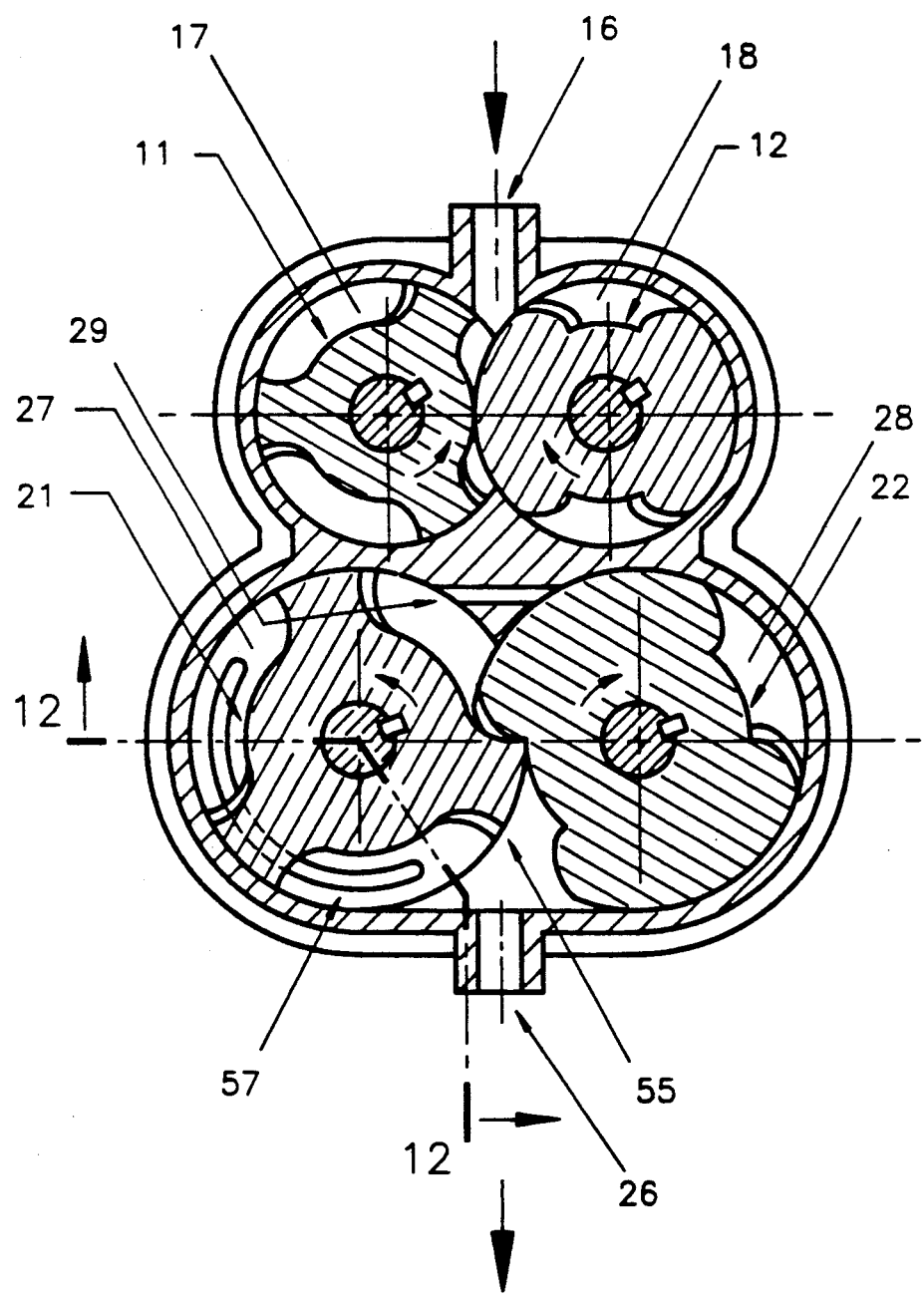
FIG. 6 is a sectional view taken along line 6—6 of FIG. 4.
Figure 12:
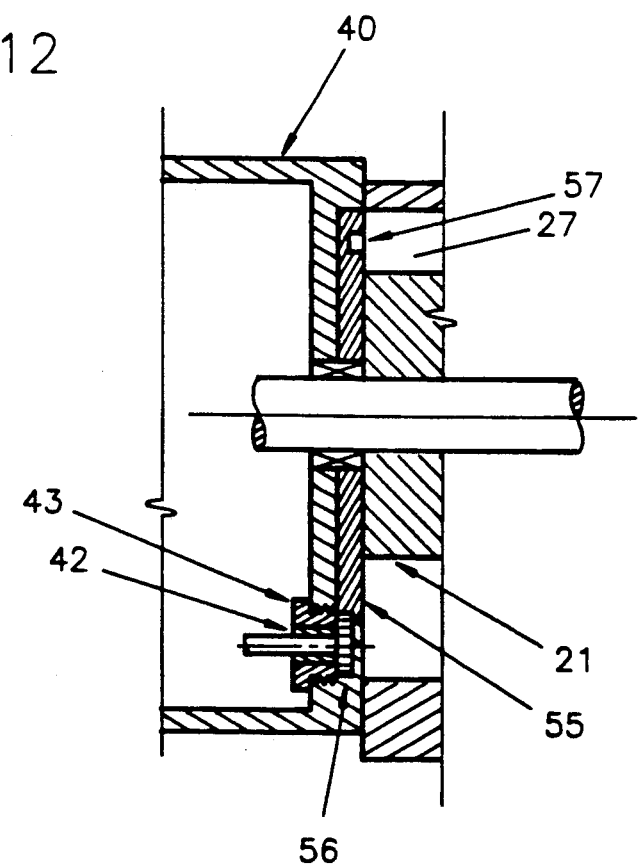
FIG. 12 is a partial section taken along line 12—12 of FIG. 6.

The present invention always makes combustion gases expand to a predetermined pressure (generally 1 atm) regardless of load by operation of the vacuum preventing disk 55 that, as shown in FIGS. 6 and 12, is inserted between the power female rotor 21 and the end plate with the timing gear box 40. This disk has the gas feedback passage 57 in the shape of groove on the rotor side, and its gear is meshed with the pinion 56; the gas feedback passage and the gear exist partially, not around, on the opposite side to each other. Thus if the load of this invention is increased somewhat in operation, the vacuum preventing disk 55 is turned to the rotating direction of female rotor 21 in proportion to the load increase, and reversely, if the load is decreased somewhat, the disk is turned in opposite direction of the rotor rotation in proportion to the load decrease, so that the female rotor expansion pocket 27 containing combustion gases in expanding may communicate to the side of the exhaust gas outlet 26 by the gas feedback passage 57 when the gases just expand to a predetermined pressure. Thus, because the said pocket is opened to the outlet side after the gases expand fully, gases of the outlet side can flow into the said pocket through the gas feedback passage 57, which prevents the gases from being overexpanded. Hence, the present invention can be operated in an ideal cycle, not well-known yet, introduced in the power-producing method of the Ki W. Yang's Rotary Engine (U.S. Pat. No. 4,813,388 dated Mar. 21, 1989). This cycle is similar to the otto cycle, but it is different from the otto cycle that its exhaust process is at a constant pressure instead of the constant volume of the otto cycle. It is characteristic of this cycle that the thermal efficiency is higher than that of any other cycle operating at the same compression ratio, and that exhaust gases make no explosion noises. Hence, in the present invention operating in the said cycle, the explosion noises is eliminated, and instead, useful power is produced some more; consequently, the thermal efficiency becomes the higher.

Figure 5:
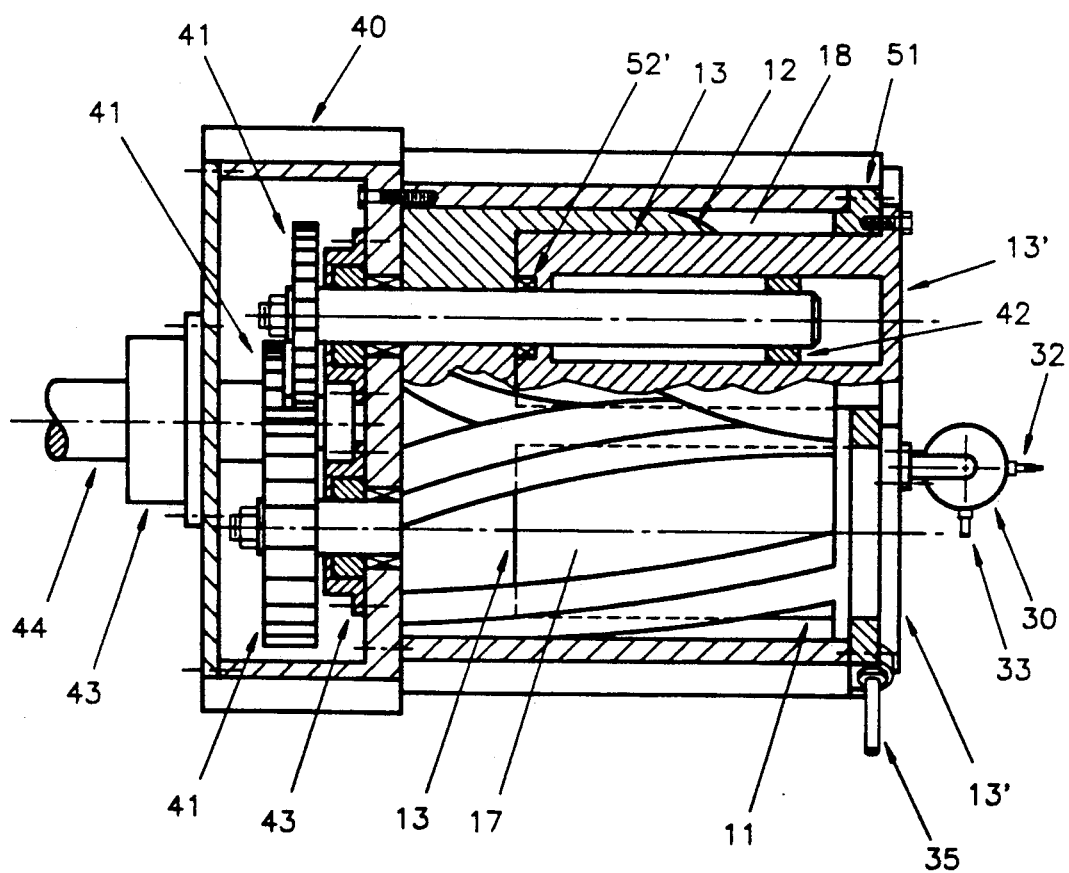
FIG. 5 is a sectional view taken along line 5—5 of FIG. 4.
Figure 7:
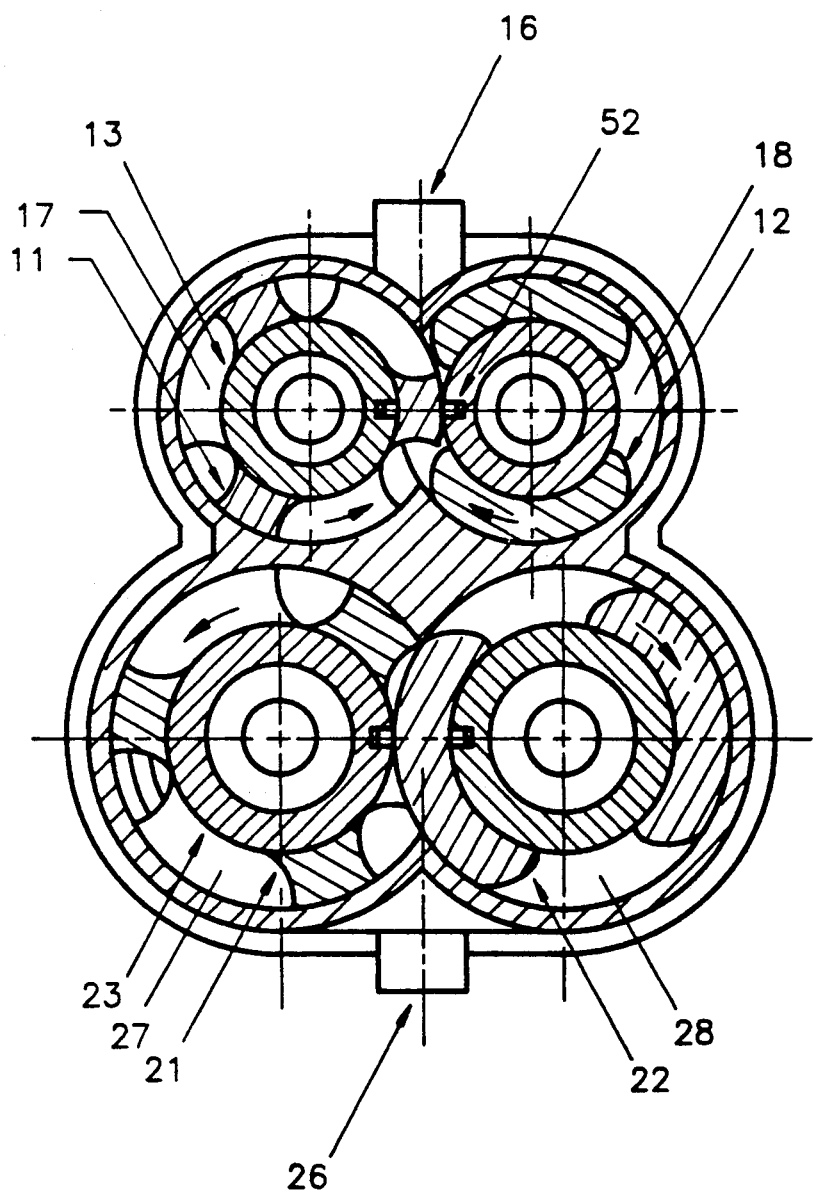
FIG. 7 is a sectional view taken along line 7—7 of FIG. 4.

Now consider that each of rotors is rotatably mounted on the cylindrical hub as shown in FIGS. 5 and 7. It is in the zone highly pressured either in the compression chamber or in the expansion chamber that the hubs exist supporting the rotors. These hubs are equipped with seals 52 with springs so as to prevent working fluid from leaking out from respective pockets. In this way, the problem of fluid seal is revolved in the present invention.

I claim:

1. A rotary device comprising:

a body chamber having two partially overlapped cylindrical bores, cylindrical hubs disposed coaxially within the bores, end plates at opposite ends of said bores, one of said end plates forming a wall for a timing box, the other of said end plates having an elongated fluid passage and an inlet arranged adjacent the end plate forming the wall for the timing gear box and in communication with the overlapped bores of said body chamber, said body chamber mounting in respective bores male and female rotors rotatably mounted on said respective hubs;

means defining a pressure balance passage between the bores of body chamber;

means for adjusting the quantity of the working fluid in said body chamber including a disk disposed between the female rotor in said body chamber and the end plate forming the wall for the timing gear box, a fluid passageway in said disk and a gear in part on the opposite side to said passageway and in meshing engagement with a pinion;

said male rotor having two projecting portions;

said female rotor having three projecting portions, a set of timing gears in said timing box interconnecting the female rotor with said male rotor so that the female rotor makes two rotations for three rotations of said male rotor, said female rotor having a ring-like plate with three holes;

said cylindrical hubs being mounted on said other end plate and having flanges, each hub having a seal to prevent working fluid from leaking out from respective pockets formed by said projecting portions of said rotors;

one of said hub flanges having an aperture in communication with said elongated fluid passage and constituting an outlet to said body chamber;

the holes in said ring-like plate of the female rotor in said body chamber being in periodic communication with said outlet in response to rotation of said female rotor in said body chamber to enable the fluid to be compressed in said body chamber by said rotors when said device is employed to compress the fluid and flow the compressed fluid through said outlet;

said elongated passage having a flow control gate for controlling the flow therethrough.

2. A rotary device comprising:

a body chamber having two partially overlapped cylindrical bores, cylindrical hubs disposed coaxially within the bores, end plates at opposite ends of said bores, one of said end plates forming a wall for a timing box, the other of said end plates having an elongated fluid passage and an outlet arranged adjacent the end plate forming the wall for the timing gear box and in communication with the overlapped bores of said body chamber, said body chamber mounting in respective bores male and female rotors rotatably mounted on said respective hubs;

means defining a pressure balance passage between the bores of said body chamber;

means for preventing working fluid from being over-expanded below a predetermined pressure regardless of load including a disk disposed between the female rotor in said expansion body chamber and the end plate forming the wall for the timing gear box, a fluid passageway in said disk and a gear in part on the opposite side to said passageway and in meshing engagement with a pinion;

said male rotor having two projecting portions;

said female rotor having three projecting portions, a set of timing gears in said timing box interconnecting the female rotor with said male rotor so that the female rotor makes two rotations for three rotations of said male rotor, said female rotor having a ring-like plate with three holes;

said cylindrical hubs being mounted on said other end plate and having flanges, each hub having a seal to prevent working fluid from leaking out from respective pockets formed by said projecting portions of said rotors;

one of said hub flanges having an aperture in communication with said elongated fluid passage and constituting an inlet to said body chamber;

the holes in said ring-like plate of the female rotor in said body chamber being in periodic communication with said inlet in response to rotation of said female rotor in said body chamber to enable the fluid to expand in said body chamber to drive said rotors when said device is employed to expand the fluid and flow the expanded fluid through said outlet;

said elongated passage having a flow control gate for controlling the flow therethrough.

3. A rotary device according to claim 2 including means for preventing working fluid from being over-expanded below a predetermined pressure regardless of load including a disk disposed between the female rotor in said expansion body chamber and the end plate forming the wall for the timing gear box, a fluid passageway in said disk and a gear in part on the opposite side to said passageway and in meshing engagement with a pinion.

4. A rotary piston engine comprising:

two segregated compression and expansion body chambers arranged parallel to and adjacent one another, with each being formed by two partially overlapped bores, cylindrical hubs disposed coaxially within the bores, end plates at opposite ends of said bores, one of said end plates forming a wall for a timing box, the other of said end plates having two elongated fluid passages, means for generating energized fluid in communication with said two fluid passages, and fluid passageway means, respectively, including an inlet and an outlet arranged adjacent the end plate forming the wall for the timing gear box and respectively in communication with the overlapped bores of said compression and expansion body chambers, each body chamber mounting in respective bores male and female rotors rotatably mounted on said respective hubs;

said expansion body chamber being larger in cross-section than said compression body chamber, means defining a pressure balance passage between the bores of said larger expansion body chamber;

means for preventing working fluid from being over-expanded below a predetermined pressure regardless of load including a disk disposed between the female rotor in said expansion body chamber and the end plate forming the wall for the timing gear box, a fluid passageway in said disk and a gear in part on the opposite side to said passageway and in meshing engagement with a pinion;

each said male rotors having two projecting portions;

each said female rotors having three projecting portions, a set of timing gears in said timing box interconnecting the female rotors one with the other and with said male rotors so that each female rotor makes two rotations for three rotations of said male rotor, each said female rotor having a ring-like plate with three holes;

said cylindrical hubs being mounted on said other end plate and having flanges, each hub having a seal to prevent working fluid from leaking out from respective pockets formed by said projecting portions of said rotors;

said generating means being coupled to said flanges of said hubs mounting the female rotors and said hub flanges having apertures in communication with said two fluid passages;

the holes in said ring-like plate of the female rotor in said compression body chamber being in periodic communication with one of said fluid passages in response to rotation of said female rotor in said compression body chamber to supply compressed fluid to said generating means through said one passage and the aperture of the hub of the female rotor in the compression body chamber;

the holes in said ring-like plate of the female rotor in said expansion body chamber being in periodic communication with the other of said fluid passages and the aperture in the hub associated with the female rotor in the expansion body chamber in response to rotation of said female rotor in said expansion body chamber to enable energized fluid from said energized fluid generating means to be supplied to the expansion chamber;

said other passage having a flow control gate for controlling the amount of energized fluid flowing from said energized fluid generating means to said expansion chamber.

5. An engine according to claim 4 including means for preventing working fluid from being over-expanded below a predetermined pressure regardless of load including a disk disposed between the female rotor in said expansion body chamber and the end plate forming the wall for the timing gear box, a fluid passageway in said disk and a gear in part on the opposite side to said passageway and in meshing engagement with a pinion.

* * * * *